Feb. 25, 1941.  J. P. BURKE  2,233,242
NUT
Filed June 22, 1939
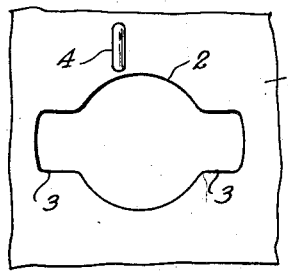
Fig. 1.
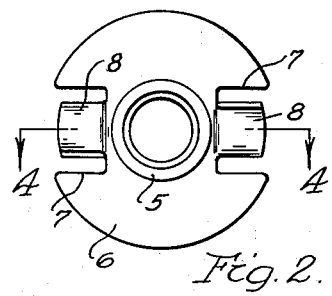
Fig. 2.
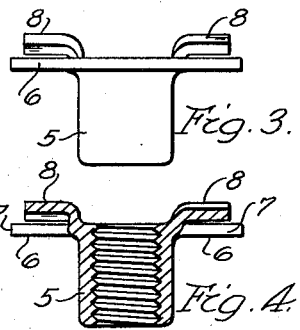
Fig. 3.
Fig. 4.
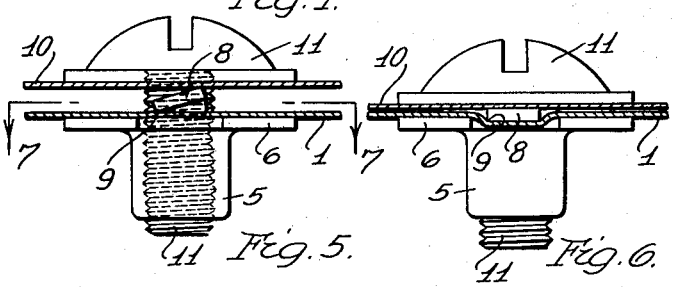
Fig. 5.
Fig. 6.
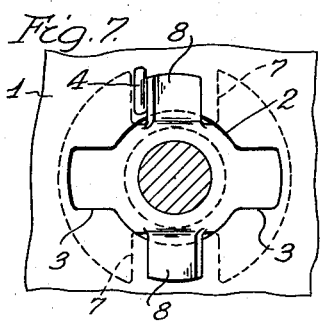
Fig. 7.
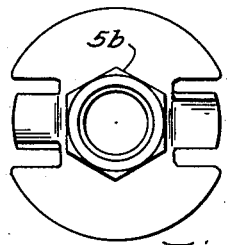
Fig. 8.
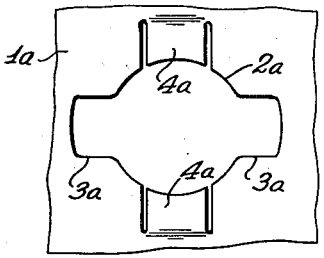
Fig. 9.
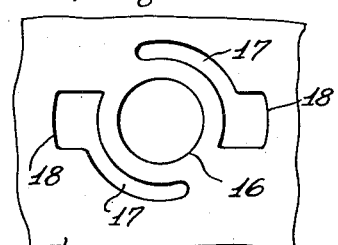
Fig. 10.
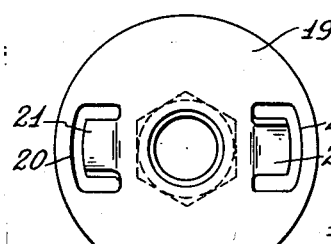
Fig. 11.
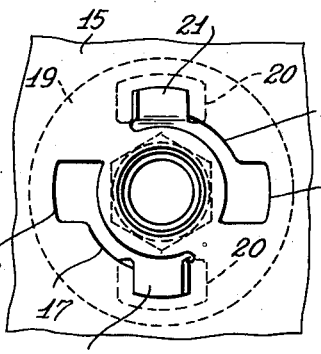
Fig. 12.
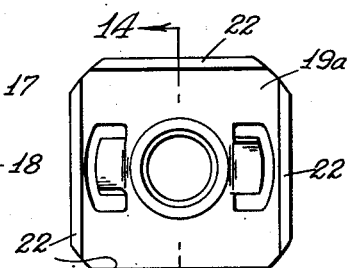
Fig. 13.
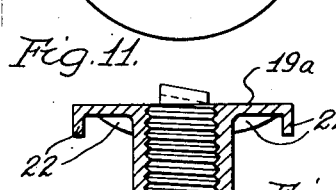
Fig. 14.
INVENTOR.
James P. Burke
BY
ATTORNEY.

Patented Feb. 25, 1941

2,233,242

UNITED STATES PATENT OFFICE 2,233,242

NUT

James P. Burke, Detroit, Mich., assignor to Bert L. Quarnstrom and F. L. McLaughlin, both of Detroit, Mich.

Application June 22, 1939, Serial No. 280,647

10 Claims. (Cl. 85—32)

This invention relates to nuts and has for its primary object to provide a nut having means for retaining itself upon one of a plurality of members to be secured together in such manner that it obviates the necessity of manually holding the nut against rotation when a bolt or screw is inserted therein, and in order that the nut may serve as a locating means for the bolt or screw and the members secured to the first member thereby.

In the fabrication of various constructions, particularly automobile bodies and parts accessory thereto, it is the common practice to first secure the nut on one of the plurality of members to be secured together, to position the nut as well as to avoid the necessity of manually holding the nut against rotation, and to enable use of a bolt and nut securing means in cases where the fabrication is such as to prevent access to the nut by a wrench.

According to common practice, the nut and aperture are made of square or D shape so that the interengaging walls of the nut and aperture make rotation of the nut impossible, and to hold the nut in the aperture integral pre-formed portions are usually clinched or riveted over the metal surrounding the aperture. With such an arrangement it is necessary, in the case of fabrication of an automobile body, to blank the apertures in the body, panels, etc., and to then convey the body, panels, etc., to a clinching press where the nuts are individually clinched. Although the nuts are firmly secured by this method, the operation is time consuming, is expensive, and exposes the body, panels, etc., to damage by deformation or by collision with other articles.

The main object of this invention, differently stated, is to provide a nut capable of retaining itself in an aperture, and also of retaining itself against rotation, without requiring clinching or riveting of any portions thereof. In this respect a nut is provided having means coacting with the portion of the apertured member adjacent to the aperture for holding itself in the aperture and against rotation.

Another object is to provide a nut having retaining means adapted to engage the apertured member to which it is secured in such manner that deformation of the apertured member is caused by insertion of a screw or bolt in the nut, said nut having means which coacts with the deformed portion to prevent removal or rotation of the nut. Differently stated, the nut retaining means functions to prevent rotation of the nut and enables insertion of a screw or bolt therein, and insertion and tightening of the screw or bolt deforms the apertured member to create a supplementary and more positive holding action. As a result, the screw or bolt may be removed without danger of the nut turning, even after the screw or bolt has been in place over a long period of time and has become more difficult to remove than when first placed.

Another object is to provide a nut of this character having a comparatively large head portion formed with projecting, cam-like arms for engagement with an apertured member, and also having portions thereof bent to provide tool engaging surfaces.

Other objects and advantages will become more fully apparent as reference is had to the accompanying drawing, wherein my invention is illustrated, and in which, Fig. 1 is a view showing a fragment of the apertured member.

Fig. 2 is a bottom plan of the nut.

Fig. 3 is a side elevation of the nut,

Fig. 4 is a cross-section of the nut,

Fig. 5 is a section illustrating the nut and bolt assembled,

Fig. 6 is a section illustrating the assembled nut and bolt tightened,

Fig. 7 is a section taken on the line 7—7 of Fig. 5,

Fig. 8 is a bottom plan of the nut, illustrating tool engaging means,

Fig. 9 is a fragmental view of an apertured member, illustrating modification of the rotation preventing means, Fig. 10 is a fragmental view of an apertured member, illustrating modification of the nut retaining means receiving means, Fig. 11 is a plan of a nut illustrating an alternative formation of the retaining means, Fig. 12 illustrates the elements of Figs. 10 and 11 in assembled relation, Fig. 13 is a bottom plan of a nut such as shown in Fig. 11 with bent portions thereon forming tool engaging surfaces, and Fig. 14 is a section taken on the line 14—14 of Fig. 13.

More particularly, 1 designates a sheet metal member having an aperture 2 therein. The aperture has radial extensions 3, and the member 1 has a struck-up portion 4 spaced from both aperture extensions.

A nut having an internally threaded stem 5 has a flange or abutment 6 at one end thereof. The flange 6 is notched at 7 and formed to provide radial arms 8. The radial arms 8 are of less width than the notches 7, are removed from the plane of the flange 6, and are inclined as the nut is viewed in side elevation to provide a lead angle.

In assembling the nut on the member 1 the arms 8 are inserted through the aperture extensions 3, which places the flange 6 in engagement with the surface of the member 1. The nut is then rotated to move the arms 8 out of register with the extensions through which they were inserted, and one of the arms engages the struck-up portion 4 to restrict rotation of the nut in one direction. Rotation of the nut in a reverse direction is prevented by the trailing edge 9 of each arm 8, which tends to "bite" into the surface of the member 1.

An apertured sheet metal member 10 which is to be secured to the member 1 has a screw or bolt 11 inserted therethrough and engaging in the threaded stem 5 of the nut. Due to the manner of insertion of the nut retaining means, that is, with the arms 8 rotatable in a clockwise direction, insertion of a right-hand screw or bolt 11 tends to cause retrograde rotation of the arms. As the head of the screw engages the member 10, and the latter is pressed downwardly against the arms 8, the retaining edges 9 are pressed more firmly into engagement with the member 1, thus causing a more secure holding action. As the bolt 11 is completely tightened, as shown in Fig. 6, the metal of the member 1 engaged by the arms 8 is deformed and pressed into the notches 7, and the arms 8 become flattened and disposed in the deformed portions of the member 1, to positively prevent rotation of the nut.

In Fig. 8 a nut is illustrated which is constructed identical to the nut above described, with the exception that the stem 5b is of hexagonal shape, instead of being round. This showing is intended as being illustrative of any of the various commonly known nut forms, enabling gripping by a wrench or similar tool.

Fig. 9 illustrates a sheet metal member 1a having an aperture 2a with radial extensions 3a. Instead of a projection 4 for engagement by the arms 8, the member 1a is pierced to form tongues 4a. As the arms 8 are moved into engagement with the tongues 4a the latter are deflected from their normal plane, and the sides of the arms 8 engage the sides of the openings from which the tongues are thus displaced.

A sheet metal member 15 having an aperture 16 for the reception of a bolt (such as the bolt 11) is shown in Fig. 10. Arcuate slots 17 are formed in the member 15, adjacent the aperture 16, and have enlarged portions 18 disposed on diametrically opposite sides of the opening 16 for the reception of arms such as shown at 8, or such as shown in Fig. 11 and as illustrated in Fig. 12.

The nut shown in Fig. 11 has a large radially extending flange 19 with portions thereof removed to form openings 20 and with other portions struck upwardly therefrom to form arms 21. The arms 21 are inclined or, in other words, have a lead angle, and in assembly are inserted through respective enlarged slot portions 18 and the nut is then turned so that the arms are moved out of register with the slot portions 18. The ends of the slots 17 restrict rotation in one direction and the trailing edges of the arms 21 engage the surface of the member 15 to prevent rotation in the other direction.

In Figs. 13 and 14 the nut illustrated is substantially identical to that shown in Fig. 11. The nut has peripheral portions of its flange 19a bent through approximately 90° to form a plurality of tool gripping surfaces 22.

It will be noted that in all forms, although different specific structural arrangements are shown, it is not necessary to insert the stem portion of the nut through the aperture which enables assembly of the nut on a member. The nut, therefore, may be gripped in a tool, the retaining arms placed through the respective openings, and the nut turned. This, of course, is a much simpler operation than would be the case if the arrangement were reversed; or, in other words, if the stem were projected through the aperture and the retaining arms were on the same side of the flange as the stem portion of the nut.

What is claimed is:

1. A nut comprising an internally threaded body portion and a substantially annular abutment extending radially at one end thereof, radially extending retaining means endwise spaced from the abutment on the side opposite said body portion, a member having an aperture with a radial extension through which said retaining means is inserted and turned to engage one surace and to hold said abutment in contact with the other surace, and tool engaging means comprising portions of said abutment bent perpendicular to the normal plane of the abutment and on the opposite side of said abutment as compared to said retaining means.

2. A nut comprising an internally threaded body portion and an abutment extending radially at one end thereof, radially extending retaining means endwise spaced from the abutment on the side opposite said body portion, a member having an aperture with a radial extension through which said retaining means is inserted and turned to engage one surface and to hold said abutment in contact with the other surface, means for limiting said turning movement of said retaining means, and means for preventing retrograde turning movement of said retaining means, said last two means comprising a pair of opposed shoulders formed adjacent the aperture in said member and adapted to be engaged by said retaining means after a predetermined turning movement.

3. A nut comprising an internally threaded body portion and a flange extending radially at one end thereof, said flange having portions struck outwardly therefrom and forming radial arms disposed in a plane spaced from the flange in a direction endwise of the nut, said flange also having peripheral portions bent perpendicular to the normal plane thereof in a direction opposite to the radial arms and constituting tool engaging means, and an apertured member through which said arms are inserted and rotated, said arms engaging one side of said apertured member and holding said nut in engagement with the other side.

4. A nut comprising an internally threaded body portion and a flange extending radially at one end thereof, said flange having a notch therein, a radially extending arm integral with said nut and overlying the notch in said flange in a plane spaced endwise from the flange, and an apertured member through which said arm extends, said arm engaging one surface of said apertured member and holding said flange in engagement with the other side, and a spring finger formed integral with said apertured member and adapted to be pressed into said notch by said arm.

5. A nut comprising an internally threaded body portion and a flange extending radially at one end thereof, said flange having a notch therein, a radially extending arm integral with said nut and overlying the notch in said flange in a plane spaced endwise from the flange, and a member having an aperture with a portion enabling insertion of said arm therethrough and another portion enabling movement of the arm out of register with the first portion, said arm being inserted through said first aperture portion and moved out of register therewith to engage one surface of said member and to hold the flange in engagement with the other surface.

6. A nut comprising an internally threaded body portion and a flange extending radially at one end thereof, said flange having a notch therein, a radially extending arm integral with said nut and overlying the notch in said flange in a plane spaced endwise from the flange, and a member having an aperture with a portion enabling insertion of said arm therethrough and another portion enabling movement of the arm out of register with the first portion, said arm being inserted through said first aperture portion and moved out of register therewith to engage one surface of said member and to hold the flange in engagement with the other surface, said arm having at least a portion thereof normally spaced from the flange a distance less than the thickness of said member.

7. A nut comprising an internally threaded body portion and a flange extending radially at one end thereof, said flange having a notch therein, a radially extending arm integral with said nut and overlying the notch in said flange in a plane spaced endwise from the flange, and a member having an aperture with a portion enabling insertion of said arm therethrough and another portion enabling movement of the arm out of register with the first portion, said arm being inserted through said first aperture portion and moved out of register therewith to engage one surface of said member and to hold the flange in engagement with the other surface, said arm being inclined to provide a lead angle and having its trailing edge spaced from the flange a distance less than the thickness of said member and being comparatively sharp.

8. A nut comprising an internally threaded body portion and a flange extending radially at one end thereof, said flange having a notch therein, a radially extending arm integral with said nut and overlying the notch in said flange in a plane spaced endwise from the flange, a member having an aperture with a portion enabling insertion of said arm therethrough and another portion enabling movement of the arm out of register with the first portion, said arm being inserted through said first aperture portion and moved out of register therewith to engage one surface of said member and to hold the flange in engagement with the other surface, and a bolt engaging said body portion and pressing said arm into engagement with said member to distort a portion of said member into said notch.

9. A nut comprising an internally threaded body portion and a flange extending radially at one end thereof, said flange having a notch therein, and a radially extending arm integral with the nut and overlying said notch in a plane spaced endwise from said flange, said arm being inclined to provide a lead angle.

10. A nut comprising an internally threaded body portion and a flange extending radially at one end thereof, said flange having radially extending retaining means spaced endwise therefrom and adapted to be rendered operative to retain the nut on a supporting member by turning movement of the nut, and said flange having peripheral portions bent perpendicular to the normal plane of the flange in a direction opposed to the retaining means and constituting tool engaging means.

JAMES P. BURKE.